United States Patent
Qi et al.

(10) Patent No.: US 8,671,722 B1
(45) Date of Patent: Mar. 18, 2014

(54) STEERING WHEEL LOCK TO BE SECURED ON THE ARMS WITHIN THE RIM OF A STEERING WHEEL

(71) Applicants: Pingjun Qi, Brooklyn, NY (US); Xuhao Qi, Brooklyn, NY (US)

(72) Inventors: Pingjun Qi, Brooklyn, NY (US); Xuhao Qi, Brooklyn, NY (US)

( * ) Notice: Subject to any disclaimer, the term of this patent is extended or adjusted under 35 U.S.C. 154(b) by 0 days.

(21) Appl. No.: 13/676,236

(22) Filed: Nov. 14, 2012

(51) Int. Cl.
*B60R 25/02* (2013.01)

(52) U.S. Cl.
USPC .............................................. 70/209; 70/226

(58) Field of Classification Search
USPC ............. 70/19, 209, 211, 212, 225, 226, 237, 70/238
See application file for complete search history.

(56) References Cited

U.S. PATENT DOCUMENTS

| | | | | |
|---|---|---|---|---|
| 4,304,110 A * | 12/1981 | Fain | ................................ | 70/209 |
| 5,121,617 A * | 6/1992 | Chen | ................................ | 70/209 |
| 5,131,245 A * | 7/1992 | Chen | ................................ | 70/209 |
| 5,144,822 A * | 9/1992 | Jan et al. | ........................ | 70/209 |
| 5,197,308 A * | 3/1993 | Pazik | .............................. | 70/209 |
| 5,199,283 A * | 4/1993 | Chen | ................................ | 70/209 |
| 5,253,497 A * | 10/1993 | Hsieh | ............................... | 70/209 |
| 5,406,813 A * | 4/1995 | Lo | ................................... | 70/209 |
| 5,491,990 A * | 2/1996 | Von-Lambert | ................... | 70/209 |
| 5,598,725 A * | 2/1997 | Chang | ............................... | 70/209 |
| 5,671,620 A * | 9/1997 | Carvey et al. | .................... | 70/238 |
| 5,678,434 A * | 10/1997 | Kuo et al. | ........................ | 70/209 |
| 5,778,709 A * | 7/1998 | Hsu | ................................. | 70/209 |
| 6,016,674 A * | 1/2000 | Yang | ............................... | 70/209 |
| 6,058,749 A * | 5/2000 | Rekemeyer | ...................... | 70/226 |
| 6,679,089 B2 * | 1/2004 | Moreton | ......................... | 70/209 |
| 6,901,781 B1 * | 6/2005 | Lin | ................................. | 70/209 |
| 2002/0078723 A1 * | 6/2002 | Vickers | ........................... | 70/209 |
| 2002/0095959 A1 * | 7/2002 | Meekma et al. | ................ | 70/209 |
| 2005/0193785 A1 * | 9/2005 | Lin | ................................. | 70/209 |
| 2007/0074549 A1 * | 4/2007 | Su | .................................. | 70/209 |
| 2007/0163311 A1 * | 7/2007 | Yang et al. | ...................... | 70/209 |
| 2008/0169913 A1 * | 7/2008 | Yu | ............................. | 340/426.23 |
| 2009/0031765 A1 * | 2/2009 | Liu | ................................. | 70/209 |
| 2009/0282878 A1 * | 11/2009 | D'Angelo | ....................... | 70/209 |
| 2011/0036132 A1 * | 2/2011 | Lee | ................................. | 70/211 |

* cited by examiner

Primary Examiner — Lloyd Gall

(57) ABSTRACT

A bar shaped steering wheel lock including two "L" shaped hooks obliquely attached on the lock body, an interior rod covered by trapezoidal thread for connecting the two hooks, a locking mechanism and an extendable sleeve. The trapezoidal thread allows the rod to be locked in position by the locking mechanism. The steering wheel lock is mounted firmly on a steering wheel by firstly inserting the two hooks into the holes on the wheel and secondly by stretching the two hooks until both the two hooks are secured on the arms within the rim of the steering wheel allowing the sleeve to be extended outward. The extended sleeve thus blocks the complete rotation of the steering wheel.

5 Claims, 4 Drawing Sheets

(Unfolded view of the edge)

STEERING WHEEL LOCK TO BE SECURED ON THE ARMS WITHIN THE RIM OF A STEERING WHEEL

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND OF THE INVENTION

1. Field of the Invention

The present invention relates to steering wheel locks, and more particularly to an automobile anti-theft device that prevents the steering wheel from turning and from being sawed.

2. Description of the Prior Arts

An automobile steering wheel lock is aimed to block the rotation of the steering wheel. Therefore the reliability of such device depends on how firmly it can stay on the steering wheel. A popular model disclosed is long-rod shaped steering wheel locks, among which generally a pair of telescopically extendable members is placed across the steering wheel while enabling two opposite facing "U" shaped hooks built on said members to be engaged on the rim of the steering wheel and to be locked by a locking means. The extended member on the device then blocks the rotation of the steering wheel. This type of steering wheel lock is easy to use. However, it suffers from three drawbacks. Firstly, it can be turned within the rim of the wheel which made it easy to be removed when the rim is sawed. Secondly the exposure of the ratchet teeth on the interior rod significantly decreases the strength of the device. Thirdly it is too long to be stored while not in use. In order to disable the turning of the steering wheel lock inside the rim of the wheel, another structure which features four "U" shaped hooks has been disclosed. This advanced model is mounted horizontally across the wheel while covering the horizontal arms within the wheel. But it only overcomes the first problem and the size of the device becomes even bigger.

SUMMARY OF THE INVENTION

The present invention provides an improved automobile steering wheel lock that eliminates the foresaid drawbacks. In order to fulfil the purpose, firstly the two hooks are designed to be secured on two arms which are less than 180 degrees away from each other within the rim of the steering wheel. Because the interior arms are used to support the rim of the wheel, thus the strength of these arms is relatively higher than the rim. The improvement therefore has accomplished to increase the bonding strength between the lock and the wheel. It also disables the rotation of the lock within the steering wheel and makes it more difficult to be removed by sawing the steering wheel.

Secondly, trapezoidal thread has been applied on the interior rod allowing the impact made by the rod to the grooved pin within the locking mechanism to be reduced. Trapezoidal thread also has a greater strength than ratchet teeth and is easier to produce.

Thirdly, the locking mechanism is built beside the two hooks instead of between them. The device therefore becomes shorter in length. This also eliminates the exposure of the trapezoidal thread and significantly increases the strength of the interior rod.

BRIEF DESCRIPTION OF THE DRAWINGS

The invention will be better understood and objects other than those set forth above will become apparent when consideration is given to the following detailed description thereof. Such description makes reference to the annexed drawings wherein.

DETAILED DESCRIPTION OF THE INVENTION

Figure 1:
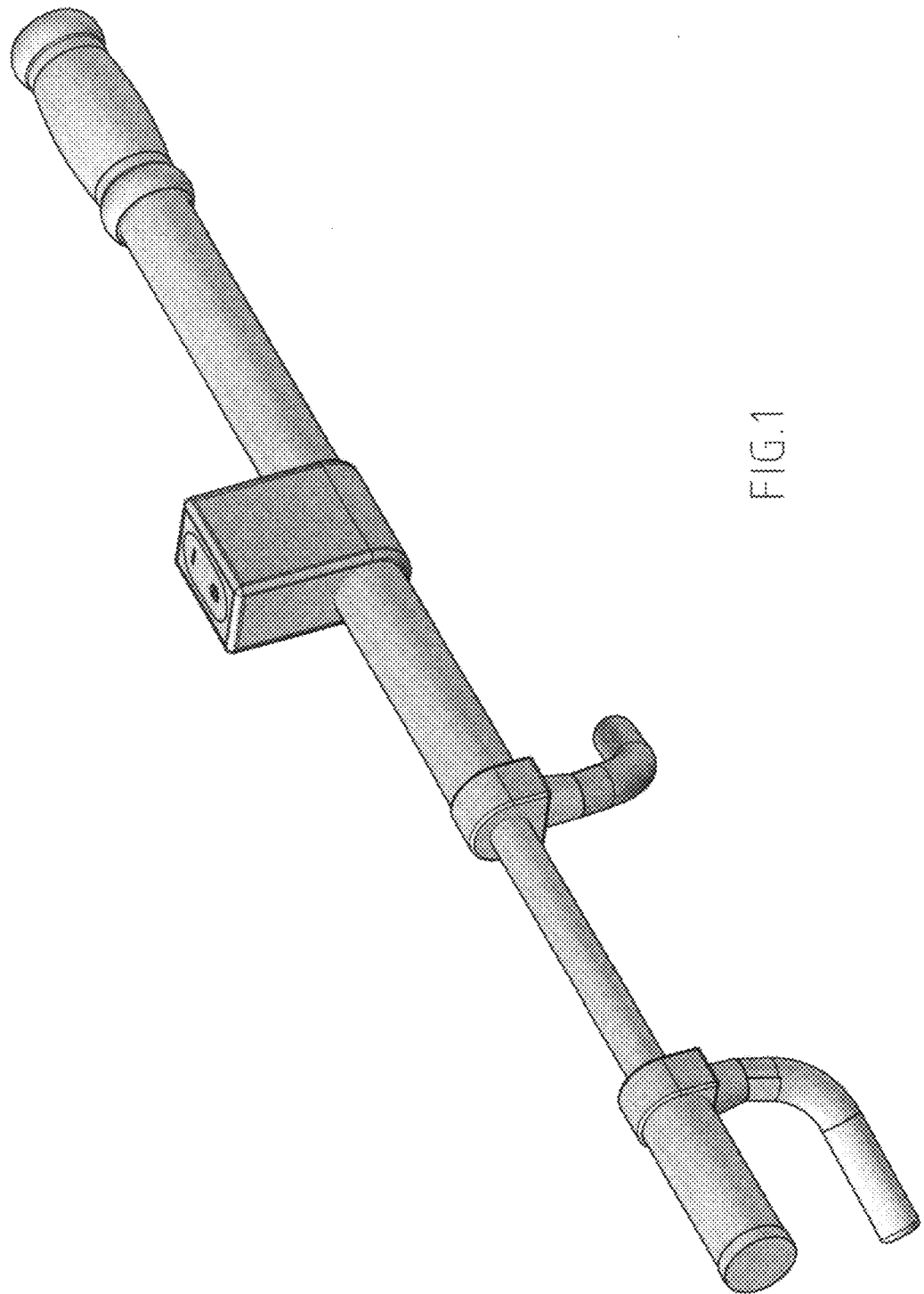
FIG. 1 is a perspective illustration of the steering wheel lock according to the present invention.
Figure 2:
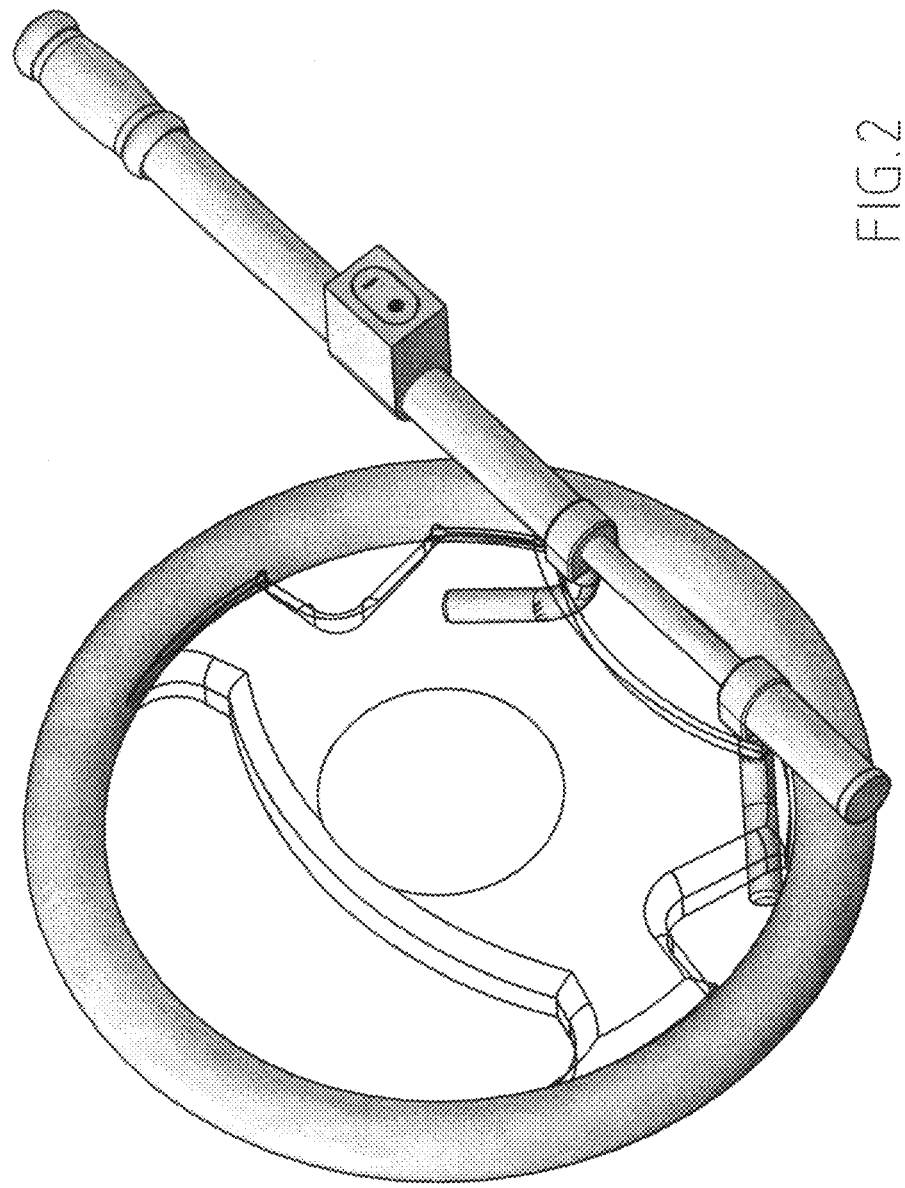
FIG. 2 is a perspective illustration of the steering wheel lock according to the present invention in use.
Figure 3:
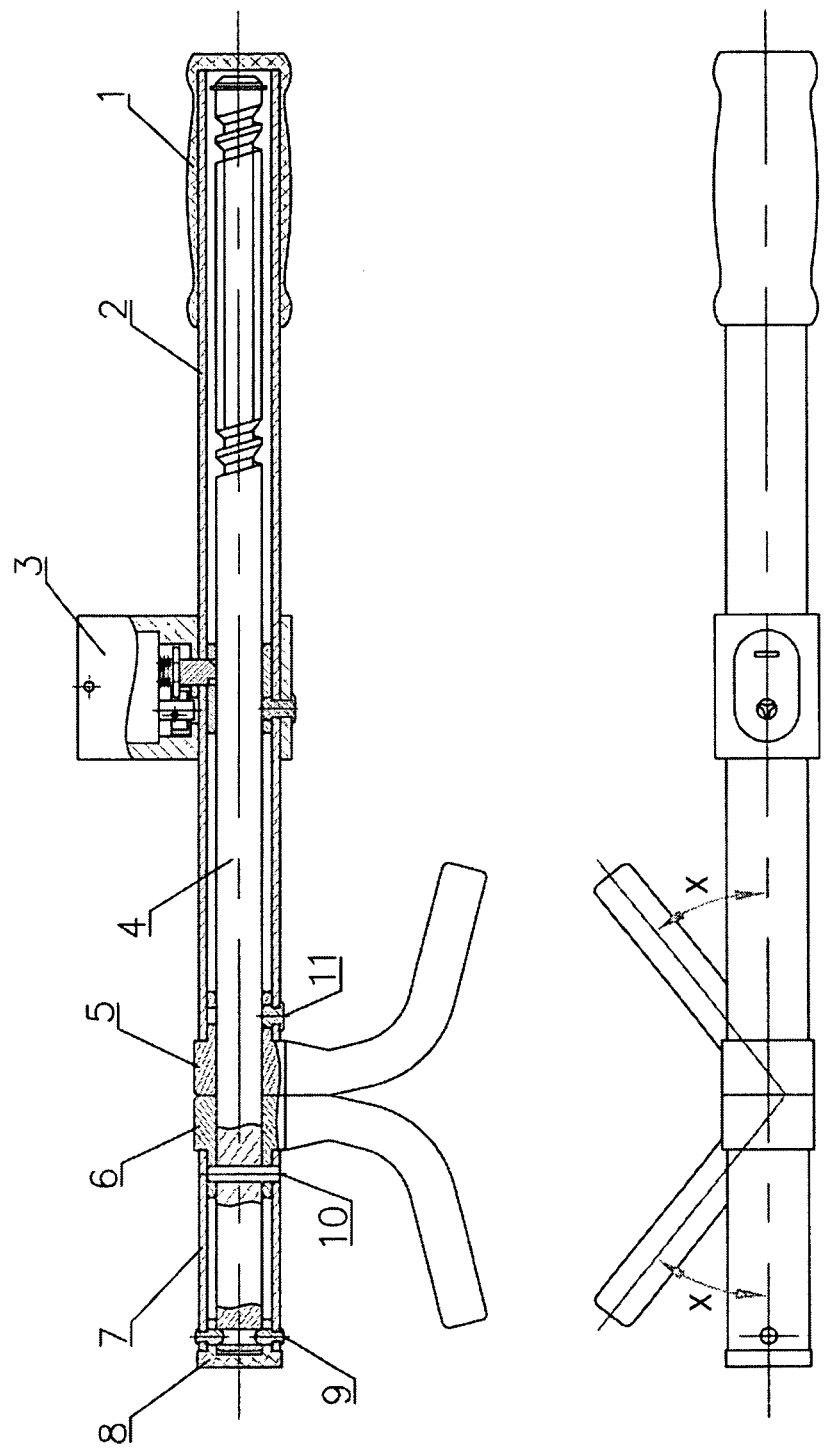
FIG. 3 is a structural illustration of the steering wheel lock according to the present invention in the unlocked position.

Referring initially to FIG. 3, where the right end cover 1 made by hard rubber covers the right end of the right protective sleeve 2 while absorbing any external shocks. The lock housing 3 contains the lock core and a set of locking/unlocking mechanism which will be further explained in FIG. 4. The right hook 5 is angled at x degrees from the axis of the interior rod 4 and can be secured on an arm within the rim of the steering wheel. The left hook 6 is also angled at x degrees from the axis of the interior rod 4 and can be secured on another arm within the rim of the steering wheel. The value x cannot be 0 degrees but can vary in a range of −60 degrees to +60 degrees. A hard rubber made left end cover 8 closes the left end of the left protective sleeve 7 for absorbing any external shocks. The right end of the cover 8 extends into the left sleeve 7 for a firmer engagement. Two rivets 9 engage the left sleeve 7 with the interior rod 4 and the left end cover 8. A metal pin 10 engages the left sleeve 7 and the left hook 6 with the interior rod 4. Another rivet 11 engages the right protective sleeve 2 with the right hook 5.

Figure 4:
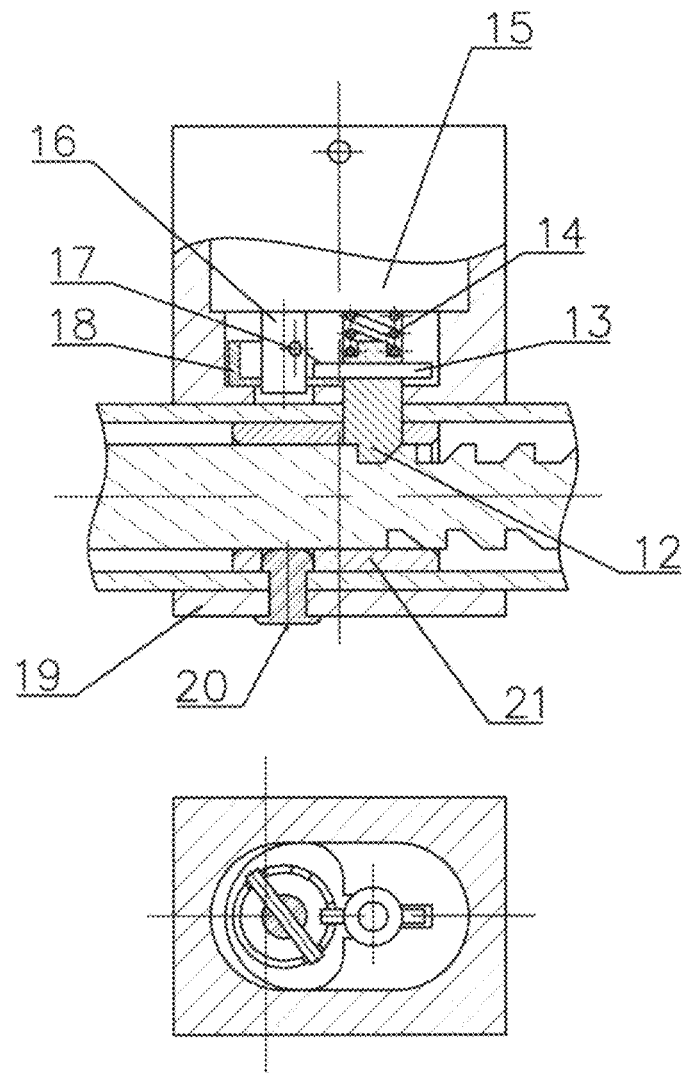
FIG. 4 is a structural illustration of a lock housing 3 according to the present invention in the locked position and the unfolded view of the edge of a drive plate 18.
Figure 4:
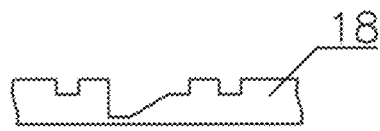

Referring to FIG. 4, in which the top graph is an enlargement of the lock housing 3, the middle graph is the top view of the set of locking/unlocking mechanism within the lock housing 3 while the lock core is removed and the bottom graph is the unfolded view of the edge of the drive plate 18. The lock housing 3 contains a clutch lock core 15, a set of locking/unlocking mechanism and a lock housing case 19. The set of locking/unlocking mechanism is therefore everything within the lock housing 3 except the clutch lock core 15 and the lock housing case 19. In the top graph, the bottom part of the pin 12 is crafted in a shape that fits accurately into the valley of the trapezoidal thread on the rod 4. More specifically, the left bottom of the pin 12 is notched vertically so that whenever pin 12 sinks into the valley of the trapezoidal thread on rod 4, the vertical notch on the pin 12 will block the corresponding vertical side of the trapezoidal thread and therefore prevent rod 4 from moving to the right. Also, an angular cut has been made to the right bottom of the pin 12 to make the right bottom of the pin 12 lie on the corresponding slope side of the trapezoidal thread on the rod 4 whenever pin 12 sinks into to the valley of the trapezoidal thread on the rod 4. A metal pin 13 guided by a drive plate 18 is attached through the top of the pin 12 for guiding the pin 12. A spring 14 restores the position of pin 12 to lock the interior rod 4. The clutch lock core 15 contains a shaft 16 on which a bolt 17 is attached. The bolt 17 then guides the rotation of the drive plate 18. While rotating, the bevel edge, the unfolded view of which can be seen in the bottom graph, of the drive plate 18 lifts the metal pin 13 causing pin 12 to move upward and thus unlocks the interior rod 4. A rivet 20 engages the lock housing case 19 with the interior sleeve 21 and the right sleeve 2. The interior sleeve 21 regulates the path of the interior rod 4.

When in use, firstly insert the two hooks 5 and 6 into the space between the arms within the rim of the steering wheel, then stretch the two, hooks until both of them are secured on the arms. Both the left sleeve 7 and the right sleeve 2 should be pressed tightly onto the surface of the steering wheel. In such situation pin 12 within the lock housing 3 is pushed into the gap of the trapezoidal thread on the rod 4 by the spring 14. While the horizontal movement of the rod 4 is blocked, the positions of both hooks are secured and thus the steering wheel lock is engaged firmly on the steering wheel. The complete rotation of the steering wheel is blocked when the sleeve 2 is partially extended outside the steering wheel.

When unlocking the device, firstly insert the key to turn the shaft 16 and the bolt 17. The drive plate 18 is thus rotated by the bolt 17 causing the pin 13 to move upward and exit from the trapezoidal thread after which the left hook 6 and the interior rod 4 can be restored. Secondly pull the two hooks 5 and 6 back together to take off the steering wheel lock.

What is claimed is:

1. An automobile anti-theft device to be mounted on a steering wheel for preventing the steering wheel from being turned and from being sawed comprising:
   an interior rod covered with trapezoidal thread;
   a left hook (6) placed on a left sleeve angled at x degrees from the axis of said interior rod;
   a right hook (5) placed on a right sleeve also angled at x degrees from the axis of said interior rod;
   said value x cannot be 0 degrees but can vary in a range of −60 degrees to +60 degrees;
   a pin (12) placed perpendicular to said interior rod and can be pushed into said trapezoidal thread to lock said interior rod;
   a lock housing placed on said right sleeve such that the exposure of said trapezoidal thread is eliminated when said interior rod is pulled out fully;
   said lock housing further contains a set of locking/unlocking mechanism covered and sealed by a clutch lock core and a lock housing case;
   a drive plate located within said lock housing for driving a metal pin (13) attached on said pin (12); and
   said right sleeve protects said interior rod and prevents the steering wheel from turning while extended.

2. The automobile anti-theft device as claimed in claim 1, wherein
   said trapezoidal thread contains a vertical side and a slope side angled at an acute angle from the axis of said interior rod.

3. The automobile anti-theft device as claimed in claim 1, wherein
   said pin (12) is comprised by an upper half through which said metal pin (13) is attached for guiding said pin (12);
   a bottom that fits accurately into said trapezoidal thread; and
   said bottom further comprises a left bottom portion and a right bottom portion in which only the vertical of said left bottom portion blocks the horizontal movement of said interior rod.

4. The automobile anti-theft device as claimed in claim 1, wherein
   said drive plate is rotated by a bolt and thus either lifts or drops said pin (12);
   said bolt is attached on a shaft (16) on said clutch lock core; and
   the torque generated from turning said clutch lock core is transformed by said drive plate to a force that lifts or drops said pin (12).

5. The automobile anti-theft device as claimed in claim 1, wherein
   two rivets are applied to engage a hard rubber made left end cover (8) with said left sleeve and said interior rod;
   a third rivet is used to engage said right hook (5) with said right sleeve; and
   a fourth rivet is used to engage said lock housing with a interior sleeve along with said right sleeve.

\* \* \* \* \*